United States Patent [19]

Kobayashi

[11] Patent Number: 4,803,030

[45] Date of Patent: Feb. 7, 1989

[54] METHOD OF MOLDING CASE FOR PUSH-BUTTON SWITCH

[75] Inventor: Masato Kobayashi, Iwaki, Japan

[73] Assignee: Alps Electric Co., Ltd., Japan

[21] Appl. No.: 101,129

[22] Filed: Sep. 24, 1987

[30] Foreign Application Priority Data

Dec. 9, 1986 [JP] Japan ................................ 61-293868
Dec. 9, 1986 [JP] Japan ................................ 61-293867

[51] Int. Cl.⁴ ........................ B29C 45/14; B29C 45/33

[52] U.S. Cl. ................................ 264/278; 264/272.15; 264/277

[58] Field of Search .................... 264/272.15, 277, 278

[56] References Cited

U.S. PATENT DOCUMENTS 2,341,364 2/1944 Crumrine ........................ 264/278 X
4,246,213 1/1981 Takamatsu et al. ............ 264/250 X

FOREIGN PATENT DOCUMENTS 59-6444 2/1984 Japan .
61-85728 5/1986 Japan .................................. 264/277

*Primary Examiner*—Jan H. Silbaugh
*Assistant Examiner*—Yun H. Wang
*Attorney, Agent, or Firm*—Guy W. Shoup; Paul J. Winters; Leighton K. Chong

[57] ABSTRACT

A method of molding a case for use in a push-button switch as employed on a television receiver, video tape recorder, or the like. A contact plate having a central fixed contact and two opposite fixed contacts is mounted between an upper die and a lower die. One of the dies has a central support portion and two opposite support portions. In one embodiment, the central fixed contact and the opposite firxed contacts are pressed against the central support portion and the opposite support portions, respectively. A locating pin that tapers off is pressed against the central fixed contact. Two other locating pins are pushed to the vicinities of the opposite fixed contacts.

2 Claims, 4 Drawing Sheets

METHOD OF MOLDING CASE FOR PUSH-BUTTON SWITCH

FIELD OF THE INVENTION

The present invention relates to a push-button switch that can be used in the input devices of a television receiver, a video tape recorder, a cassette deck, and various other devices and, more particularly, to an improved method of molding a case for a push-button switch.

BACKGROUND OF THE INVENTION

The conventional method of molding a case for a push button switch is described below by referring to FIGS. 6–9. Referring first to FIG. 6, there is shown a push-button switch of this kind. This switch has a case 1 made from synthetic resin. A central fixed contact 2 is inserted in the bottom wall of the case 1. Also, fixed contacts 3 are inserted in the bottom wall and disposed on opposite sides. Terminals 4 extend from the fixed contacts 2 and 3 and protrude downwardly from both sides of the case. A curved movable contact 5 is disposed on the fixed contacts 3. A stem 6 having a protrusion 6*a* is disposed on the movable contact 5 to permit the operator to depress the movable contact. An annular member 7 is mounted on the case 1 to limit upward movement of the stem 6.

The manner in which the case 1 of this pushbutton switch is molded is described now by referring to FIG. 7. A hoop-like contact plate 8 having the central fixed contact 2 and the opposite fixed contacts 3 is disposed between an upper fixed die 11 and a lower movable die 12. After the dies 11 and 12 are tightened together, resin such as polyethylene terephthalate or polybutylene terephthalate is molten within a molding machine 13. The resin is injected into a cavity 17 formed between the dies 11 and 12 from the molding machine 13 through a spray 14, a runner 15, and a submarine gate 16 that is formed in the lower movable die 12 and extends to one side of the cavity. In this way, the case 1 is molded out of the resin.

Where the case 1 is molded in the manner described above, the fixed contacts 2 and 3 are placed only on support portions 12*b* and 12*c* on a protruding block 12*a* of the lower movable die 12. Therefore, a gap tends to be produced between the fixed contact 2 or 3 and the support portion 12*b* or 12*c*. If resin intrudes into this gap, the resin covers the fixed contacts 2 and 3. This introduces the problem that when the switch is used, a perfect contact will not be made between the movable and fixed contacts.

Accordingly, as shown in FIG. 8, a locating pin 19 whose front end is curved protrudes from the upper movable die 11 and bears against the central fixed contact 2. Locating pins 20 whose front ends are flat protrude also from the upper die 11 and bear against the opposite fixed contacts 3. In this way, the fixed contacts 2 and 3 are pressed against the lower die 12 to prevent the fixed contacts 2 and 3 from being covered with the resin when the case 1 is molded.

The conventional method of molding the case makes use of the locating pins 19 and 20 which protrude from the upper fixed die 11, in order to prevent the formation of a gap between the fixed contact 2 or 3 and the lower die 12. The pins 19 and 20 place the fixed contacts 2 and 3 in position. Since these pins 19 and 20 are cylindrical in shape, after the case 1 is molded on the contact plate 8, holes 1*a* and 1*b* are formed between the bottom surface of the case 1 and the fixed contacts 2 and 3, as shown in FIG. 9, to allow the pins to be withdrawn.

When the terminal 4 of the push-button switch is soldered to a printed-wiring board 21, if the soldering operation is performed manually, then almost no problem will occur. However, if the terminal 4 is automatically dipped in solder, then soldering flux which is sprayed from the underside intrudes into the holes 1*a* in the case 1 via terminals 21*a* of the board 21, the holes 1*a* being formed to withdraw the locating pins 20 for supporting the opposite fixed contacts 3. Sometimes, the flux intrudes into the hole 1*b* in the case 1, the hole 1*b* being formed to withdraw the locating pin 19 that holds the central fixed contact 2. Then, the flux moves upward through a narrow gap between the case 1 and the fixed contact 2 or 3, so that it adheres to these contacts 2 and 3. Consequently, the electrical connection of the movable contact 5 with the fixed contacts 2 and 3 deteriorates, and a good contact between them is not made.

SUMMARY OF THE INVENTION

Accordingly, it is an object of the present invention to provide a method of molding a case in which a movable contact makes good contact with fixed contacts.

The above object is achieved by a method of molding a case, said method comprising the steps of: mounting a contact plate between an upper die and a lower die, the plate having a central fixed contact and opposite fixed contacts; and injecting molten resin into a cavity formed between the dies.

In one embodiment of the invention, the central fixed contact is caused to bear against a central support portion of one of the dies. Also, the opposite fixed contacts are caused to bear against opposite support portions of the die. A locating pin whose front end portion tapers off protrudes from the other die. This pin is pressed against the central fixed contact. Other locating pins protrude from the other die and face the opposite fixed contacts in such a way that slight gaps are left between these contacts and the pins.

When a case is molded, the central fixed contact is pressed against the die by the locating pin. The opposite fixed contacts are pressed against the die by the pressure of the resin which flows through the gaps between the opposite fixed contacts and the locating pins that face the contacts.

In another embodiment of the invention, the opposite support portions of the die against which the opposite fixed contacts bear are so shaped as to substantially conform to the contours of the opposite fixed contacts. A locating pin whose front end portion tapers off protrudes from the other die, and is pressed against the central support portion to place the central fixed contact in position.

When a case is molded, the central fixed contact and the opposite fixed contacts are brought into intimate contact with the upper or lower die. Therefore, it is unlikely that molten resin flows either between the central fixed contact and the corresponding die or between the opposite fixed contacts and the corresponding die. Also, when a push-button switch comprising this case is automatically dipped in solder and attached to a printed-wiring board, flux does not intrude into the contacts.

Other objects and features of the invention will appear in the course of the description thereof which follows.

DETAILED DESCRIPTION OF THE INVENTION

Figure 1:
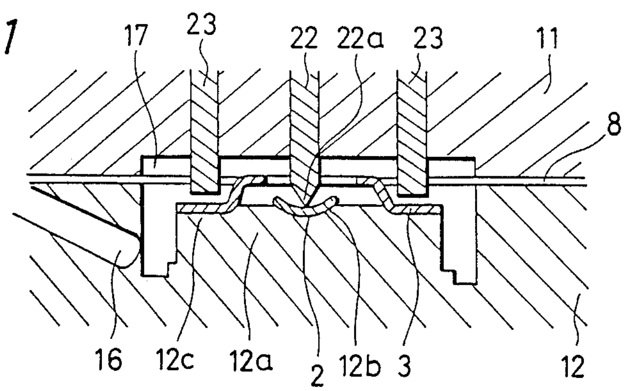
FIG. 1 is a cross-sectional view of main portions of dies with which a case is molded in accordance with the invention.
Figure 2:
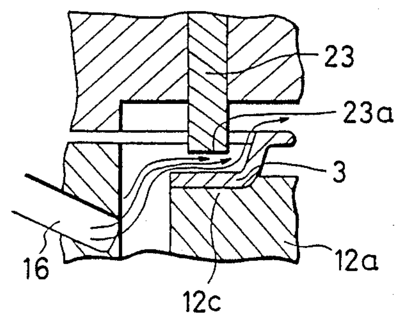
FIG. 2 is an enlarged cross section of main portions of dies shown in FIG. 1, for showing the manner in which resin flows between opposite fixed contacts and locating pins.
Figure 3:
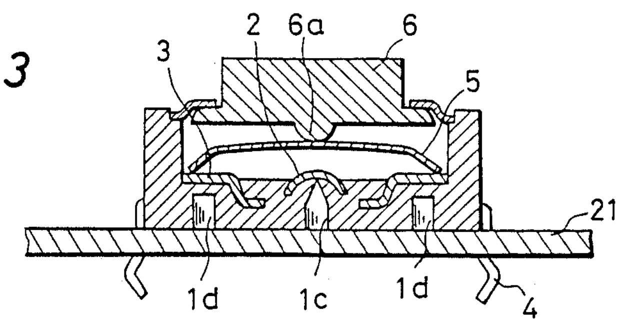
FIG. 3 is a cross-sectional view of a push-button switch comprising a case molded with the dies shown in FIG. 1, and in which the switch is mounted on a printed-wiring board.

It is to be noted that like components are denoted by like reference numerals throughout all the figures. Referring to FIGS. 1–3, there are shown an upper fixed die 11 and a lower movable die 12 which are used to mold a case 1 in accordance with the invention. A contact plate 8 having a central fixed contact 2 and opposite fixed contacts 3 is disposed between the dies 11 and 12 in the same manner as the prior art device. The dies are characterized in that the central contact 2 is pressed against the support portion **12*b* of a protruding block 12*a* by a locating pin 22, and that other locating pins 23 located above the contacts 3 protrude in such a way that slight gaps are left between the upper surfaces of the contacts 3 and the pins 23. The pin 22 has a front end portion 22*a* that tapers off. The front end 23*a* of each pin 23** is flat.

When a case is to be molded, using the structure constructed as described above, resin is molten within the molding machine and injected into the cavity formed between the upper fixed die 11 and the lower movable die 12 through a submarine gate 16. Since the central fixed contact 2 is pressed against the support portion **12*b* of the protruding block 12*a* by the front end portion 22*a* of the locating pin 22, it is unlikely that the resin flows between the central contact 2 and the support portion 12*b*. As shown in FIG. 2, the molten resin flows as indicated by the arrows to press the opposite fixed contacts 3 against the support portions 12*c* on the opposite sides of the block 12*a*, because the locating pins 23 protrude such that gaps of about 0.5 mm are left between the pins 23 and the opposite contacts 3. Hence, the resin will not be forced between the contacts 3 and the support portions 12*c***.

After the push-button switch shown in FIG. 3 is assembled, using the case 1 molded as described above, the terminal 4 is automatically dipped in solder and mounted on the printed-wiring board 21. In this case, holes **1*c* and 1*d* are formed in the case 1 to permit withdrawal of the locating pins 22 and 23. Since the holes 1*d* do not extend to the opposite fixed contacts 3, flux does not enter the holes 1*d*. Also, flux does not intrude into the fixed contact 2 or 3, because the front end of the hole 1*c* which is on the underside of the central contact 2 is shaped into a minute hole conforming to the shape of the front end portion 22*a* of the pin 22**.

Figure 4:
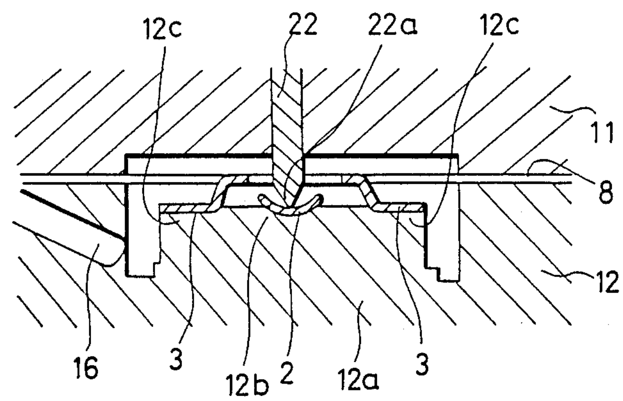
FIG. 4 is a cross-sectional view of main portions of other dies according to the invention, for showing another method of molding a case.
Figure 5:
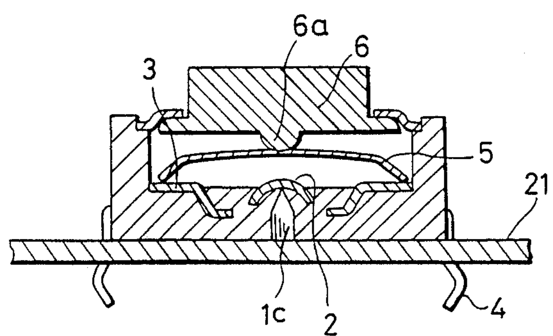
FIG. 5 is a cross-sectional view of a push-button switch comprising a case molded with the dies shown in FIG. 4, and in which the switch is mounted on a printed-wiring board.
Figure 6:
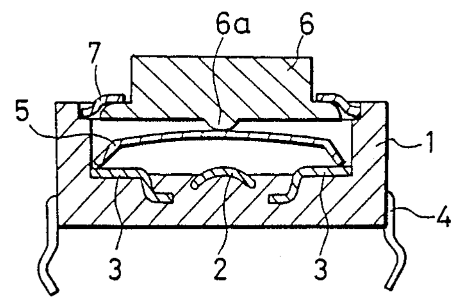
FIG. 6 is a cross-sectional view of a conventional push-button switch.
Figure 7:
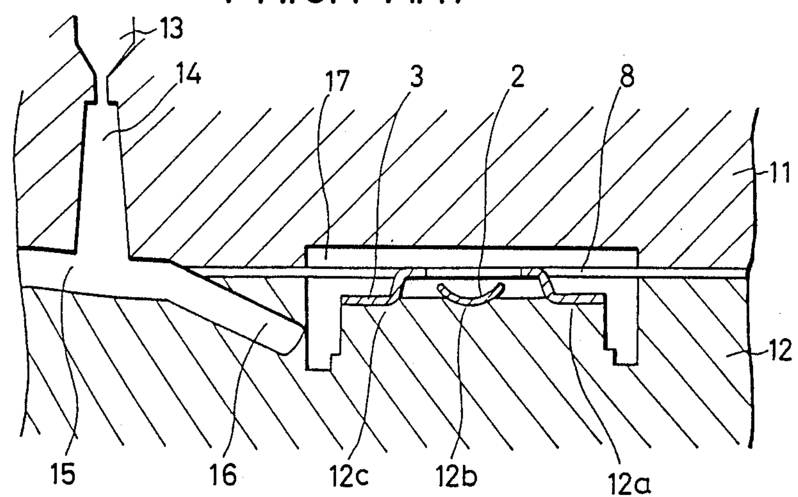
FIG. 7 is a cross-sectional view of main portions of dies with which a conventional case is molded.
Figure 8:
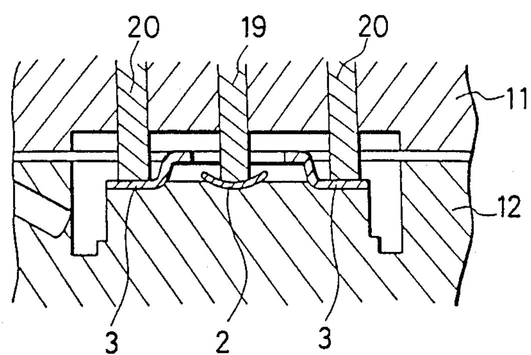
FIG. 8 is a cross-sectional view of an improvement over the dies shown in FIG. 7, and in which fixed contacts are pressed against one die by locating pins.
Figure 9:
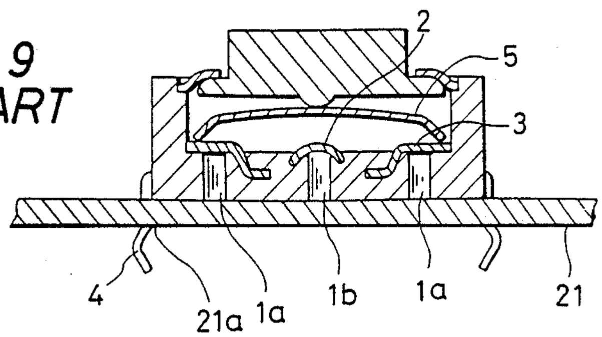
FIG. 9 is a cross-sectional view of a conventional push-button switch, and in which the switch is mounted on a printed-wiring board;aand
Figure 10:
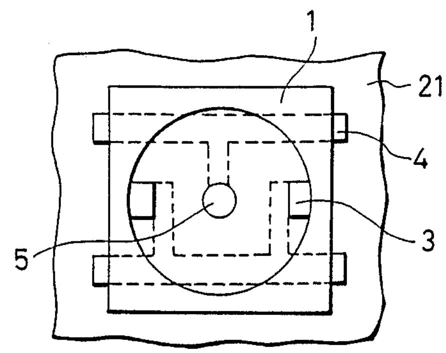
FIG. 10 is a plan view of the switch shown in FIG. 9, for showing the relation between the case and fixed contacts.

Referring next to FIGS. 4 and 5, there is shown another embodiment of the invention. A lower movable die 12 has support portions **12*c* on which opposite fixed contacts 3 are placed. The support portions 12*c* are so shaped as to substantially conform to the shape of the opposite fixed contacts 3. A locating pin 22 for pressing a central fixed contact 2 against support portions 12*b* of the die 12 has a front end portion 22*a*** that tapers off.

When a case is to be molded, using the structure constructed as described above, resin is molten within the molding machine and injected into the cavity formed between an upper fixed die 11 and the lower movable die 12. Because the central contact 2 is firmly pressed against the support portion **12*b* of the lower die 12 by means of a locating pin 22 protruding from the upper die 11, and because the opposite contacts 3 are brought into engagement with the similarly shaped support portions 12*c*, the resin does not flow between the lower die 12 and the contact 2 or 3. The front end portion 22*a* of the pin 22** tapers off.

After the case 1 is molded in the manner as described above, the push-button switch shown in FIG. 5 is assembled, using the case 1. Then, the terminal 4 is soldered to a printed-wiring board 21. When the case 1 is molded, a hole **1*c* conforming to the shape of the front end portion 22*a* of the locating pin 22 is formed on the underside of the central contact 2. Since the diameter of the hole 1*c* that is on the underside of the central contact 2 is very small, it is unlikely that flux enters the central contact 2 through this hole 1*c***.

When the push-button switch is operated, the stem 6 is depressed to reverse the direction of the curvature of the movable contact 5. Thus, the central fixed contact 2 is electrically connected with the opposite fixed contacts 3 via the movable contact 5. At this time, the switching action of the push-button switch is performed very well, because neither resin nor flux adheres to the fixed contact 2 or 3.

In the example described above, the contact plate 8 is pressed against the lower movable die 12. The present invention is not limited to this structure. For example, the contact plate 8 may be pressed against the upper fixed die.

As described above, in the first embodiment of the invention, a locating pin having a tapering front end portion is pressed against a central fixed contact. Other locating pins protrude above opposite fixed contacts in such a way that slight gaps are left between the pins and these contacts. In the second embodiment, one die has support portions against which opposite fixed contacts bear. These support portions are so shaped as to substantially conform with the contours of the opposite fixed contacts. A locating pin having a tapering front end portion is pressed against a central fixed contact. Therefore, when a case is molded, molten resin does not pass between the central contact and the corresponding die or between the opposite fixed contacts and the correspoding die. Also, when a push-button switch comprising the case is automatically dipped in solder and mounted on a printed-wiring board, flux does not intrudes into any contact. Therefore, imperfect contact between movable and fixed contacts can be prevented. Hence, a highly reliable push-button switch is provided.

What is claimed is:

1. A method of molding a case for use in a push-button switch, comprising the steps of:

preparing a contact plate having a central fixed contact and opposite fixed contacts;

preparing an upper die and a lower die one of which has a central support portion and opposite support portions;

mounting the contact plate between the upper and lower dies in such a way that respective contact surfaces on one side of the central fixed contact and the opposite fixed contacts bear against the central support portion and the opposite support portions, respectively;

moving a locating pin that has a tapered front end portion having a point through the other die and pressing the point of the pin against a holding surface on an opposite side from the contact surface of the central fixed contact;

moving other locating pins through said other die so that these pins protrude toward respective holding surfaces on the opposite sides from the contact surfaces of the opposite fixed contacts with slight gaps formed between ends of these pins and the respective holding surfaces;

injecting molten resin into a cavity formed between the dies so as to mold the central fixed contact and opposite fixed contacts in a molded switch body; and withdrawing the tapered locating pin and the other locating pins from the molded switch body and leaving a central tapered hole coming to a point at the holding surface of the central fixed contact, and opposite holes spaced by molded resin from the holding surfaces of the opposite fixed contacts by said slight gaps therebetween, which thereby do not allow solder flux to enter around said contacts.

2. A method of molding a case for use in a push-button switch, comprising the steps of:

preparing a contact plate having a central fixed contact and opposite fixed contacts;

preparing an upper die and a lower die one of which has a central support portion and opposite support portions, the opposite support portions being so shaped as to substantially conform to the contours of the opposite fixed contacts of the contact plate;

mounting the contact plate between the upper and lower dies in such a way that respective contact surfaces on one side of the central fixed contact and the opposite fixed contact bear against the central support portion and the opposite support portions, respectively;

moving a locating pin that has a tapered front end portion having a point through the other die and pressing the point of the pin against a holding surface on an opposite side from the contact surface of the central fixed contact, in order to place the central fixed contact in position;

injecting molten resin into a cavity formed between the dies so as to mold the central fixed contact and opposite fixed contacts in a molded switch body, the molten resin covering the surfaces of the opposite fixed contacts not in contact with the opposite support portions, but not passing between the contact surfaces of the opposite fixed contacts and the opposite support portions; and withdrawing the tapered locating pin from the molded switch body and leaving a central tapered hole coming to a point at the holding surface of the central contact which thereby does not allow solder flux to enter around said central contact.

* * * * *